(12) United States Patent
Catlin et al.

(10) Patent No.: US 6,989,072 B2
(45) Date of Patent: Jan. 24, 2006

(54) SOLVENT WELDING PROCESS

(75) Inventors: Tanguy Marie Louis Alexandre Catlin, Brussels (BE); Gwenael Delamarche, Brussels (BE); Atef Mohammed Bahay Eldin Haikal, Bever (BE); Nigel Patrick Sommerville Roberts, Newcastle Upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 70 days.

(21) Appl. No.: 10/199,546

(22) Filed: Jul. 19, 2002

(65) Prior Publication Data
US 2003/0034126 A1    Feb. 20, 2003

(30) Foreign Application Priority Data
Jul. 19, 2001    (GB) ................................ 0117522

(51) Int. Cl.
*C09J 5/02*    (2006.01)
(52) U.S. Cl. ................ 156/305; 156/308.4; 156/308.6
(58) Field of Classification Search ............... 156/305, 156/308.4, 308.6; 264/241
See application file for complete search history.

(56) References Cited

U.S. PATENT DOCUMENTS

| | | | | |
|---|---|---|---|---|
| 3,769,136 A | * | 10/1973 | Ospelt | 156/157 |
| 3,793,023 A | * | 2/1974 | Land | 430/212 |
| 4,923,557 A | * | 5/1990 | Dickey | 156/86 |
| 5,132,036 A | * | 7/1992 | Falou et al. | 510/277 |
| 5,160,654 A | | 11/1992 | Falou et al. | |
| 5,198,198 A | | 3/1993 | Gladfelter et al. | |
| 5,512,120 A | * | 4/1996 | Hinton et al. | 156/215 |
| 5,554,673 A | * | 9/1996 | Shah | 524/104 |
| 5,693,411 A | * | 12/1997 | Hansen et al. | 442/417 |
| 5,888,603 A | * | 3/1999 | Fergason | 428/46 |

FOREIGN PATENT DOCUMENTS

WO    WO 97/35539    10/1997

\* cited by examiner

*Primary Examiner*—Allan R. Kuhns
(74) *Attorney, Agent, or Firm*—Armina E. Matthews; Kim W. Zerby; Steven W. Miller

(57) ABSTRACT

The present invention relates to a solvent-welding process for water-soluble films, characterised in that the solvent has a viscosity of from 1.5 to 15,000 mPa.s.

10 Claims, No Drawings

SOLVENT WELDING PROCESS

CROSS REFERENCE TO RELATED APPLICATIONS

This application claims priority under 35 U.S.C. § 119(a) to Great Britain Application Serial No. 0117522.3, filed Jul. 19, 2001.

TECHNICAL FIELD

The present invention relates to a solvent-welding process for water-soluble films, particularly for the production of water-soluble cleaning or fabric care pouches.

BACKGROUND TO THE INVENTION

Water-soluble pouch compositions are known in the art. These compositions are easy to dose, handle, transport and store. Recently, water-soluble pouches containing cleaning or fabric care compositions have become popular.

U.S. Pat. No. 5,132,036 and U.S. Pat. No. 5,160,654 describe laundry treatment products in the form of a single or multi-compartment sachet which may be water-soluble. U.S. Pat. No. 5,198,198 describes a water-soluble container containing a multiple use amount of, for example, a fabric treatment composition.

Usually the pouches are formed by placing two sheets of material together, heat-sealing three edges, filling and then heat-sealing the forth edge. However, this method has the draw back that it is relatively slow and expensive. This is particularly an issue for cleaning or fabric care pouches which must be produced quickly and cheaply. In addition, heat sealing does not provide a strong seal and the heat can damage the pouch material resulting in leakage of the contents. Also, with heat sealing it is very difficult to seal more than two films together.

An alternative method of sealing is known as solvent-welding. This involves applying solvent to the film material and forming a seal between the solvated film and another film. Solvent-welding has the advantage that can be done quickly, continuously and does not use as much energy as heat-sealing. An additional advantage of solvent-welding is that the seal actually strengthens after the seal is made. This is due to the gradual loss of solvent from the seal area after the welding process which causes the bond between the film material to become stronger.

WO-A-97/35539 describes a method of encapsulation involving solvent-welding wherein the solvent is water. Water is the most convenient solvent for water-soluble pouches being cheap and easily obtainable. However, water alone is difficult to use in such a process because it rapidly flows away from the area to be sealed. Another problem is that it is difficult to apply the water homogenously causing some areas of the film to be weakened while other are not sufficiently solvated. Furthermore, solvent welding using water often results in air bubbles in the seal which weaken the seals integrity. All this means that it is difficult to implement high speed production of pouches using water as the solvent.

It is an object of the present invention to provide a solvent-welding process for water-soluble films, and in particular for the production of water-soluble pouches, that avoids the problems of the prior art. The process of the present invention uses a solvent system that has a specified viscosity. The solvent of the present invention does not cause such damage to the film, is easier to apply uniformly and produces a strong, stable seal. Consequently, the resultant pouches show less leakage over time than prior art solvent-welded pouches. Furthermore, the present process allows high-speed production and can be operated continuously. In addition, the present process allows more than two films to be sealed together. Other objects and advantages shall become apparent as the description proceeds.

SUMMARY OF THE INVENTION

The present invention relates to a solvent-welding process for water-soluble films, characterised in that the solvent has a viscosity of from 1.5 to 15,000 mPa.s.

DETAILED DESCRIPTION OF THE INVENTION

The process of the present invention comprises the steps of applying a solvent having a viscosity of from 1.5 to 15,000 mPa.s to a water-soluble film and contacting the solvated film with another section of film which may be plasticised itself but preferably is not. The present process is particularly suited for the production of water soluble pouches such as cleaning or fabric care pouches.

The process preferably comprises the steps of:
(a) partially enclosing a composition with film material,
(b) apply a solvent having a viscosity of from 1.5 to 15,000 mPa.s to the film material,
(c) applying pressure and, optionally, heat to the solvated film material in order to form a seal.

The pouches herein may be formed by pulling the film material into a mould using a vacuum. This vacuum can also be used to keep the film flush with the inner walls of the mould. A composition may then be poured into the mould, a second film may be placed over the mould with the composition and the pouch may then be sealed by solvent-welding and, optionally, heat sealed.

Therefore, the process preferably comprises the steps of:
(a) releasably fixing film material in a mould,
(b) adding a composition to the mould,
(c) placing a second film over the mould,
(d) solvent-welding at least part of the two films together using a solvent having a viscosity of from 1.5 to 15,000 mPa.s,
(e) optionally, heat-sealing the two films together.

As used herein the term "solvent-welding" refers to the process of forming at least a partial seal between two or more layers of film material by use of a solvent. This does not exclude that heat and pressure may also be applied to form a seal.

Solvent

The process of the present invention must involve solvent-welding of the film material. This solvent-welding can be performed using any suitable conditions but must use a solvent having a viscosity of from 1.5 to 15,000 mPa.s, preferably from 10 to 13,000 mPa.s, more preferably from 15 to 10,000 mPa.s (measured by DIN 53015 at 20° C.). It has been found that the viscosity of the solvent is an important in ensuring an efficient process. It is believed that this is because the solvent must be sufficiently viscous so as to avoid flowing away from the area to be sealed, thus helping to ensure that the film material is solvated equally.

In a preferred process herein the film is coated with a solvent coat having a thickness in the range from 1 $\mu$m to 100 $\mu$m, preferably from 3 $\mu$m to 50 $\mu$m.

Suitable solvents for use herein are those which do not completely dissolve the film under the conditions of sealing. The suitability of the solvent can be tested by cutting a 2 cm$^2$ piece of polyvinyl alcohol film (PT75 available from Aicello Chemical Company, 45 Koshikawa, Ishimakihonmachi Toyohasi, Aichi 441-1115 Japan) and placing the film in 100 ml of solvent at 20° C. for 5 minutes. If the film is not completely dissolved after 5 minutes then the solvent is suitable for use herein. Preferably, the film will not dissolve for at least 10 minutes. More preferably the film will not dissolve in solvent at temperature of 35° C.

The viscosity of the solvent can be modified using any suitable viscosity control agent. For example, thickening agents can be added to the solvent mixture. Preferred thickening agents include thickeners of natural origin such as hydrophobically modified carboxylic acid polymers, agarose, carrageen gums, alginates, pektins,guar-gums, starch, dextrins, gelatine and casein. Organically modified thickeners of natural origin such as carboxymethylcellulose, hydroxyethylcellulose, and hydroxypropylcellulose. Fully synthetic thickeners such as polyacryl and polymethacryl-compounds, vinyl polymers, polycarboxylates, polyether, polyimines, polyamides, and mixtures thereof. Especially preferred thickeners are hydrophobically modified carboxylic acid polymers such as those available from Rohm % & Haas, Philadelphia, USA under the trade name Acusol.

The solvents herein preferably comprise plasticisers. These are substances used to impart flexibility, workability or stretchability to the film material. A description of plasticisers can be found in "Polyvinyl Alcohol—Properties & Applications", Finch, J. Wiley & Sons, 1973, pp 352–362. Suitable plasticisers for use herein are those which do not completely dissolve the film used at 20° C. Preferred plasticisers do not completely dissolve the film even at a temperature of 35° C. Preferably the solvent herein comprises from 0.1% to 99%, more preferably from 1% to 90%, even more preferably from 5% to 70%, by weight of plasticiser.

Although any suitable plasticiser that meets the above criteria may be used, preferred plasticisers for use herein include glycols and mixtures of glycols. Preferably the plasticisers for use herein are selected from ethylene glycol, 1,3 propanediol, 1,2 propanediol, tetramethylene glycol, pentamethylene glycol, hexamethylene glycol, glycerol, 2,3-butane diol, 1,3 butanediol, diethylene glycol, triethylene glycol, polyethylene glycols, and mixtures thereof. More preferably the plasticisers for use herein are selected from ethylene glycol, 1,3 propanediol, 1,2 propanediol, 1,3 butanediol, and mixtures thereof. Most preferred is 1,2 propanediol.

The solvent for use herein preferably comprises auxiliary substance(s) other than the plasticiser. Any suitable substance may be used (i.e. one that doesn't excessively damage the film during the sealing process). Preferably the solvent comprises from 1% to 99.9%, more preferably 5% to 95%, by weight, of auxiliary substance(s). The auxiliary substances for use herein are preferably selected from pH control agents, solublised polyvinyl alcohol, perfumes, dyes, surfactants, other water-soluble polymers, and mixtures thereof. A preferred auxiliary is a mixture of water and polyvinyl alcohol.

Therefore, preferred solvents for use herein comprise plasticiser and water. A more preferred solvent comprises 1,2 propanediol, polyvinyl alcohol and water.

The present invention includes the use of a solvent such as described above for solvent welding of pouch material.

The process of the present invention is a solvent-welding process. However, in order to form a good seal using this process it is often necessary to use pressure and heat. Therefore, a preferred process involves applying solvent comprising plasticiser to the film and then applying heat and/or pressure in order to form a seal. The temperature is preferably from 30° C. to 250° C., more preferably from 50° C. to 200° C. The pressure is preferably from 10 Nm$^{-2}$ to 1.5×10$^7$ Nm$^{-2}$, more preferably from 100 Nm$^{-2}$ to 1×10$^5$ Nm$^{-2}$.

Pouches

The pouch is made from a film material. It is preferred that the pouch as a whole comprises material which is water-dispersible or more preferably water-soluble. Preferred water-soluble films are polymeric materials, preferably polymers which are formed into a film or sheet. The material in the form of a film can for example be obtained by casting, blow-moulding, extrusion or blow extrusion of the polymer material, as known in the art.

The pouch can be of any form, shape and material which is suitable to hold the composition, e.g. without allowing the release of the composition from the pouch prior to contact of the pouch to water. The exact execution will depend on, for example, the type and amount of the composition in the pouch, the number of compartments in the pouch, the characteristics required from the pouch to hold, protect and deliver or release the compositions. The present pouches can be a single compartment pouch or a multi-compartment pouch.

The pouch may be of such a size that it conveniently contains either a unit dose amount of the composition herein, suitable for the required operation, for example one wash, or only a partial dose, to allow the consumer greater flexibility to vary the amount used, for example depending on the size and/or degree of soiling of the wash load.

Preferred water-dispersible material herein has a dispersability of at least 50%, preferably at least 75% or even at least 95%, as measured by the method set out hereinafter using a glass-filter with a maximum pore size of 50 microns.

More preferably the material is water-soluble and has a solubility of at least 50%, preferably at least 75% or even at least 95%, as measured by the method set out hereinafter using a glass-filter with a maximum pore size of 50 microns, namely:

Gravimetric method for determining water-solubility or water-dispersability of the material of the compartment and/or pouch:

50 grams ±0.1 gram of material is added in a 400 ml beaker, whereof the weight has been determined, and 245 ml ±1 ml of distilled water is added. This is stirred vigorously on magnetic stirrer set at 600 rpm, for 30 minutes. Then, the mixture is filtered through a folded qualitative sintered-glass filter with the pore sizes as defined above (max. 50 micron). The water is dried off from the collected filtrate by any conventional method, and the weight of the remaining polymer is determined (which is the dissolved or dispersed fraction). Then, the percentage solubility or dispersability can be calculated.

Preferred polymer copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferably the polymer is selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, most preferably polyvinyl alcohols, polyvinyl alcohol copolymers and hydroxypropyl methyl cellulose (HPMC). Preferably, the level of a type polymer (e.g., commercial mixture) in the film material, for example PVA polymer, is at least 60% by weight of the film.

The polymer can have any weight average molecular weight, preferably from about 1000 to 1,000,000, or even form 10,000 to 300,000 or even form 15,000 to 200,000 or even form 20,000 to 150,000.

Mixtures of polymers can also be used. This may in particular be beneficial to control the mechanical and/or dissolution properties of the compartment or pouch, depending on the application thereof and the required needs. For example, it may be preferred that a mixture of polymers is present in the material of the compartment, whereby one polymer material has a higher water-solubility than another polymer material, and/or one polymer material has a higher mechanical strength than another polymer material. It may be preferred that a mixture of polymers is used, having different weight average molecular weights, for example a mixture of PVA or a copolymer thereof of a weight average molecular weight of 10,000–40,000, preferably around 20,000, and of PVA or copolymer thereof, with a weight average molecular weight of about 100,000 to 300,000, preferably around 150,000.

Also useful are polymer blend compositions, for example comprising hydrolytically degradable and water-soluble polymer blend such as polylactide and polyvinyl alcohol, achieved by the mixing of polylactide and polyvinyl alcohol, typically comprising 1–35% by weight polylactide and approximately from 65% to 99% by weight polyvinyl alcohol, if the material is to be water-dispersible, or water-soluble. It may be preferred that the PVA present in the film is from 60–98% hydrolysed, preferably 80% to 90%, to improve the dissolution of the material.

Most preferred are films, which are water-soluble and stretchable films, as described above. Highly preferred water-soluble films are films which comprise PVA polymers and that have similar properties to the film known under the trade reference M8630, as sold by Chris-Craft Industrial Products of Gary, Ind., US and also PT-75, as sold by Aicello of Japan.

The water-soluble film herein may comprise other additive ingredients than the polymer or polymer material. For example, it may be beneficial to add plasticisers, for example glycerol, ethylene glycol, diethyleneglycol, propylene glycol, sorbitol and mixtures thereof, additional water, disintegrating aids. It may be useful that the pouch or water-soluble film itself comprises a detergent additive to be delivered to the wash water, for example organic polymeric soil release agents, dispersants, dye transfer inhibitors.

It is preferred that the water-soluble film is stretched during formation and/or closing of the pouch, such that the resulting pouch is at least partially stretched. This is to reduce the amount of film required to enclose the volume space of the pouch. When the film is stretched the film thickness decreases. The degree of stretching indicates the amount of stretching of the film by the reduction in the thickness of the film. For example, if by stretching the film, the thickness of the film is exactly halved then the stretch degree of the stretched film is 100%. Also, if the film is stretched so that the film thickness of the stretched film is exactly a quarter of the thickness of the unstretched film then the stretch degree is exactly 200%. Typically and preferably, the thickness and hence the degree of stretching is non-uniform over the pouch, due to the formation and closing process. For example, when a water-soluble film is positioned in a mould and an open compartment is formed by vacuum forming (and then filled with the components of a composition and then closed), the part of the film in the bottom of the mould, furthest removed from the points of closing will be stretched more than in the top part. Preferably, the film which is furthest away from the opening, e.g. the film in the bottom of the mould, will be stretched more and be thinner than the film closest by the opening, e.g. at the top part of the mould.

Another advantage of using stretching the pouch is that the stretching action, when forming the shape of the pouch and/or when closing the pouch, stretches the pouch non-uniformly, which results in a pouch which has a non-uniform thickness. This allows control of the dissolution of water-soluble pouches herein, and for example sequential release of the components of the detergent composition enclosed by the pouch to the water.

Preferably, the pouch is stretched such that the thickness variation in the pouch formed of the stretched water-soluble film is from 10 to 1000%, preferably 20% to 600%, or even 40% to 500% or even 60% to 400%. This can be measured by any method, for example by use of an appropriate micrometer. Preferably the pouch is made from a water-soluble film that is stretched, said film has a stretch degree of from 40% to 500%, preferably from 40% to 200%.

Composition

Unless stated otherwise all percentages herein are weight percent of the final composition excluding the film. The composition can made by any method and can have any viscosity, typically depending on its ingredients. The liquid composition preferably has a viscosity of 50 to 10000 cps (centipoises), as measured at a rate of $20\ s^{-1}$, more preferably from 300 to 3000 cps or even from 400 to 600 cps. The compositions herein can be Newtonian or non-Newtonian. The liquid composition preferably has a density of 0.8 kg/l to 1.3 kg/l, preferably around 1.0 to 1.1 kg/l.

The pouch comprises a composition which can be in any suitable form such as a liquid, a gel, a solid, or a powder. Preferably, the pouches of the present invention comprise a liquid, a gel, or a powder. More preferably the pouches of the present invention comprise a liquid. If the pouch has multiple compartments the compartments may contain any combination of detergent compositions.

The composition can be cleaning compositions, fabric care compositions, or hard surface cleaners, more preferably laundry or dish washing compositions including, pretreatment or soaking compositions and other rinse additive compositions. Particularly preferred are laundry detergent compositions such as Ariel Liquitabs®.

The composition can comprise up to 15% by weight water, but preferably comprises less than 10%, preferably from 1% to 8%, more preferably from 2% to 7.5% by weight water. This is on basis of free water, added to the other ingredients of the composition.

If the composition is a liquid detergent composition, it is preferred that at least a surfactant and builder are present, preferably at least anionic surfactant and preferably also nonionic surfactant, and preferably at least water-soluble builder, preferably at least phosphate builder or more preferably at least fatty acid builder. Preferred is also the presence of enzymes and preferred may also be to incorporate a bleaching agent, such as a preformed peroxyacid.

Highly preferred are also perfume, brightner, buffering agents (to maintain the pH preferably from 5.5 to 9, more preferably 6 to 8), fabric softening agents, including clays and silicones benefit agents, suds suppressors, colorant or dye and/or pearlescence agent.

In hard-surface cleaning compositions and dish wash compositions, it is preferred that at least a water-soluble builder is present, such as a phosphate, and preferably also surfactant, perfume, enzymes, bleach.

In fabric enhancing compositions, preferably at least a perfume and a fabric benefit agent are present for example a cationic softening agent, or clay softening agent, anti-wrinkling agent, fabric substantive dye.

Highly preferred in all above compositions are also additional solvents, such as alcohols, diols, monoamine derivatives, glycerol, glycols, polyalkylane glycols, such as polyethylene glycol. Highly preferred are mixtures of solvents, such as mixtures of alcohols, mixtures of diols and alcohols, mixtures. Highly preferred may be that (at least) an alcohol, diol, monoamine derivative and preferably even glycerol are present. The compositions of the invention are preferably concentrated liquids having preferably less than 50% or even less than 40% by weight of solvent, preferably less than 30% or even less than 20% or even less than 35% by weight. Preferably the solvent is present at a level of at least 5% or even at least 10% or even at least 15% by weight of the composition.

Preferably the compositions of the present invention comprise surfactant. Any suitable surfactant may be used. Preferred surfactants are selected from anionic, amphoteric, zwitterionic, nonionic (including semi-polar nonionic surfactants), cationic surfactants and mixtures thereof. The compositions preferably have a total surfactant level of from 0.5% to 75% by weight, more preferably from 1% to 50% by weight, most preferably from 5% to 30% by weight of total composition. Detergent surfactants are well known and described in the art (see, for example, "Surface Active Agents and Detergents", Vol. I & II by Schwartz, Perry and Beach. Especially preferred are compositions comprising anionic surfactants. These can include salts (including, for example, sodium, potassium, ammonium, and substituted ammonium salts such as mono-, di- and triethanolamine salts) of the anionic sulfate, sulfonate, carboxylate and sarcosinate surfactants. Anionic sulfate surfactants are preferred. Other anionic surfactants include the isethionates such as the acyl isethionates, N-acyl taurates, fatty acid amides of methyl tauride, alkyl succinates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), N-acyl sarcosinates. Resin acids and hydrogenated resin acids are also suitable, such as rosin, hydrogenated rosin, and resin acids and hydrogenated resin acids present in or derived from tallow oil.

The composition can comprise a cyclic hydrotrope. Any suitable cyclic hydrotrope may be used. However, preferred hydrotropes are selected from salts of cumene sulphonate, xylene sulphonate, naphthalene sulphonate, p-toluene sulphonate, and mixtures thereof. Especially preferred are salts of cumene sulphonate. While the sodium form of the hydrotrope is preferred, the potassium, ammonium, alkanolammonium, and/or $C_2$–$C_4$ alkyl substituted ammonium forms can also be used.

The compositions herein may contain a $C_5$–$C_{20}$ polyol, preferably wherein at least two polar groups that are separated from each other by at least 5, preferably 6, carbon atoms. Particularly preferred $C_5$–$C_{20}$ polyols include 1,4 Cyclo Hexane Di Methanol, 1,6 Hexanediol, 1,7 Heptanediol, and mixtures thereof.

The compositions preferably contain a water-soluble builder compound, typically present in detergent compositions at a level of from 1% to 60% by weight, preferably from 3% to 40% by weight, most preferably from 5% to 25% by weight of the composition.

Suitable water-soluble builder compounds include the water soluble monomeric carboxylates, or their acid forms, or homo or copolymeric polycarboxylic acids or their salts in which the polycarboxylic acid comprises at least two carboxylic radicals separated from each other by not more that two carbon atoms, and mixtures of any of the foregoing. Preferred builder compounds include citrate, tartrate, succinates, oxydissuccinates, carboxymethyloxysuccinate, nitrilotriacetate, and mixtures thereof.

Highly preferred maybe that one or more fatty acids and/or optionally salts thereof (and then preferably sodium salts) are present in the detergent composition. It has been found that this can provide further improved softening and cleaning of the fabrics. Preferably, the compositions contain 1% to 25% by weight of a fatty acid or salt thereof, more preferably 6% to 18% or even 10% to 16% by weight. Preferred are in particular $C_{12}$–$C_{18}$ saturated and/or unsaturated, linear and/or branched, fatty acids, but preferably mixtures of such fatty acids. Highly preferred have been found mixtures of saturated and unsaturated fatty acids, for example preferred is a mixture of rape seed-derived fatty acid and $C_{16}$–$C_{18}$ topped whole cut fatty acids, or a mixture of rape seed-derived fatty acid and a tallow alcohol derived fatty acid, palmitic, oleic, fatty alkylsuccinic acids, and mixtures thereof.

The detergent compositions of the invention may comprise phosphate-containing builder material. Preferably present at a level of from 2% to 40%, more preferably from 3% to 30%, more preferably from 5% to 20%. Suitable examples of water-soluble phosphate builders are the alkali metal tripolyphosphates, sodium, potassium and ammonium pyrophosphate, sodium and potassium and ammonium pyrophosphate, sodium and potassium orthophosphate, sodium polymeta/phosphate in which the degree of polymerization ranges from about 6 to 21, and salts of phytic acid.

The compositions in accord with the present invention may contain a partially soluble or insoluble builder compound, typically present in detergent compositions at a level of from 0.5% to 60% by weight, preferably from 5% to 50% by weight, most preferably from 8% to 40% weight of the composition. Preferred are aluminosilicates and/or crystalline layered silicates such as SKS-6, available from Clariant.

However, from a formulation point of view it may be preferred not to include such builders in the liquid composition, because it will lead to too much dispersed or precipitate material in the liquid, or it requires too much process or dispersion aids.

It is preferred that the compositions herein comprise perfume. Highly preferred are perfume components, preferably at least one component comprising a coating agent and/or carrier material, preferably organic polymer carrying the perfume or alumniosilicate carrying the perfume, or an encapsulate enclosing the perfume, for example starch or other cellulosic material encapsulate. The inventors have found that the perfumes are more efficiently deposited onto the fabric in the compositions of the invention. Preferably the pouch compositions of the present invention comprise from 0.01% to 10% of perfume, more preferably from 0.1% to 3%.

The compositions herein can comprise fabric softening clays. Preferred fabric softening clays are smectite clays, which can also be used to prepare the organophilic clays described hereinafter, for example as disclosed in EP-A-299575 and EP-A-313146. Specific examples of suitable smectite clays are selected from the classes of the bentonites—also known as montmorillonites, hectorites, volchonskoites, nontronites, saponites and sauconites, particularly those having an alkali or alkaline earth metal ion within the crystal lattice structure. Preferably, hectorites or montmorillonites or mixtures thereof. Hectorites are most preferred clays. Examples of hectorite clays suitable for the present compositions include Bentone EW as sold by Elementis.

Another preferred clay is an organophilic clay, preferably a smectite clay, whereby at least 30% or even at least 40% or preferably at least 50% or even at least 60% of the exchangeable cations is replaced by a, preferably long-chain, organic cations. Such clays are also referred to as hydrophobic clays. The cation exchange capacity of clays and the percentage of exchange of the cations with the long-chain organic cations can be measured in several ways known in the art, as for example fully set out in Grimshaw, The Chemistry and Physics of Clays, Interscience Publishers, Inc.,pp. 264–265 (1971). Highly preferred are organophilic clays as available from Rheox/Elementis, such as Bentone SD-1 and Bentone SD-3, which are registered trademarks of Rheox/Elementis.

The compositions herein preferably comprise a bleaching system, especially a perhydrate bleach system. Examples of prehydrate bleaches include salts of percarbonates, particularly the sodium salts, and/or organic peroxyacid bleach precursor, and/or transition metal bleach catalysts, especially those comprising Mn or Fe. It has been found that when the pouch or compartment is formed from a material with free hydroxy groups, such as PVA, the preferred bleaching agent comprises a percarbonate salt and is preferably free form any perborate salts or borate salts. It has been found that borates and perborates interact with these hydroxy-containing materials and reduce the dissolution of the materials and also result in reduced performance. Inorganic perhydrate salts are a preferred source of peroxide. Examples of inorganic perhydrate salts include percarbonate, perphosphate, persulfate and persilicate salts. The inorganic perhydrate salts are normally the alkali metal salts. Alkali metal percarbonates, particularly sodium percarbonate are preferred perhydrates herein.

The composition herein preferably comprises a peroxy acid or a precursor therefor (bleach activator), preferably comprising an organic peroxyacid bleach precursor. It may be preferred that the composition comprises at least two peroxy acid bleach precursors, preferably at least one hydrophobic peroxyacid bleach precursor and at least one hydrophilic peroxy acid bleach precursor, as defined herein. The production of the organic peroxyacid occurs then by an in-situ reaction of the precursor with a source of hydrogen peroxide. The hydrophobic peroxy acid bleach precursor preferably comprises a compound having a oxy-benzene sulphonate group, preferably NOBS, DOBS, LOBS and/or NACA-OBS, as described herein. The hydrophilic peroxy acid bleach precursor preferably comprises TAED.

Amide substituted alkyl peroxyacid precursor compounds can be used herein. Suitable amide substituted bleach activator compounds are described in EP-A-0170386.

The composition may contain a pre-formed organic peroxyacid. A preferred class of organic peroxyacid compounds are described in EP-A-170,386. Other organic peroxyacids include diacyl and tetraacylperoxides, especially diperoxydodecanedioc acid, diperoxytetradecanedioc acid and diperoxyhexadecanedioc acid. Mono- and diperazelaic acid, mono- and diperbrassylic acid and N-phthaloylaminoperoxicaproic acid are also suitable herein.

Another preferred ingredient useful in the compositions herein is one or more enzymes. Suitable enzymes include enzymes selected from peroxidases, proteases, glucoamylases, amylases, xylanases, cellulases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, dextranase, transferase, laccase, mannanase, xyloglucanases, or mixtures thereof. Detergent compositions generally comprise a cocktail of conventional applicable enzymes like protease, amylase, cellulase, lipase.

pH of the Compositions

The pouch compositions of the present invention are preferably not formulated to have an unduly high pH. Preferably, the compositions of the present invention have a pH, measured as a 1% solution in distilled water, of from 7.0 to 12.5, more preferably from 7.5 to 11.8, most preferably from 8.0 to 11.5.

EXAMPLES

Example 1

A piece of Aicello PT75, 75 micron thick, is placed on top of a mould and fixed in place using a vacuum. The mould comprises a square cavity of 54 mm side and 25 mm depth. The film is heated to 100° C. by means of an infra-red lamp and is deformed using an underpressure of 400 mbar. An non-aqueous liquid (detergent) is fed into the mould. Next, a sheet of the same PT75 film is being coated with a 15 micron thick layer of solvent consisting of 80% water, 10% Propanediol 1,2 and 10% PVA (Mw 20.000–150.000 g/mol). The coated film is then rapidly (<1 sec) placed over the top of the mould holding the filled cavity with the solvent layer in-between the films. A piece of heated metal (85° C.) applies a moderate pressure onto the two layers of film for a very short time (~0.1 sec). The vacuum is removed to release the pouch.

Example 2

A piece of Monossol M8630, 76 micron thick, is placed on top of a mould and fixed in place using a vacuum. The mould comprises a square cavity of 54 mm side and 25 mm depth. The film is heated to 100° C. by means of an infra-red lamp and is deformed using an underpressure of 400 mbar. An non-aqueous liquid (detergent) is fed into the mould. Next, a sheet of the same M8630 film is being coated with a 25 micron thick layer of solvent consisting of 48% water, 50% Propanediol 1,2 and 2% PVA (Mw 20.000–150.000 g/mol). The coated film is then placed over the top of the mould holding the filled cavity with the solvent layer in-between the films. A piece of heated metal (100° C.) applies a moderate pressure onto the two layers of film for about 5 sec. The vacuum is removed to release the pouch.

What is claimed is:

1. A solvent-welding process for water-soluble films, characterised in that the solvent comprises a glycol which is a member selected from the group consisting of ethylene glycol; 2,2-propanediol; 1,2-propanediol; 1,3-propanediol; tetramethylene glycol; pentamethylene glycol; hexamethylene glycol, glycerol; 2,3-butane diol; diethylene glycol; triethylene glycol; and mixtures thereof, and said solvent has a viscosity of from 1.5 to 15,000 mPa.s.

2. A process according to claim 1 wherein the solvent does not completely dissolve the film at 20° C.

3. A process according to claim 1 wherein the solvent is 1,2-propanediol.

4. A process according to claim 1 wherein the solvent comprises from 0.1% to 99%, by weight, of said glycol.

5. A process according to claim 1 wherein the solvent has a viscosity of from 15 to 10,000 mPa.s.

6. A process according to claim 1 wherein the process comprises the steps of:
  (a) releasably fixing film material in a mould;
  (b) adding a composition to the mould;
  (c) placing a second film over the mould;
  (d) solvent-welding at least part of the two films together using said solvent; and
  (e) optionally, heat-sealing the two films together.

7. A process according to claim 1 wherein the solvent comprises a mixture of water, polyvinyl alcohol and 1,2-propanediol.

8. A process according to claim 8 wherein the water-soluble film comprises a polyvinyl alcohol.

9. A solvent-welding process for the production of water-soluble pouches, characterised in that the solvent has a viscosity of from 1.5 to 15,000 mPa.s, and said solvent comprises a glycol which is a member selected from the group consisting of ethylene glycol; 2,2-propanediol; 1,2-propanediol; 1,3-propanediol; tetramethylene glycol; pentamethylene glycol; hexamethylene glycol; glycerol; 2,3-butane diol; diethylene glycol; triethylene glycol; and mixtures thereof.

10. Use of a solvent having a viscosity of from 1.5 to 15,000 mPa.s for solvent-welding two or more layers of water-soluble film material, wherein said solvent comprises a glycol which is a member selected from the group consisting of ethylene glycol; 2,2-propanediol; 1,2-propanediol; 1,3-propanediol; tetramethylene glycol; pentamethylene glycol; hexamethylene glycol; glycerol; 2,3-butane diol; diethylene glycol; triethylene glycol; and mixtures thereof.

* * * * *